H. HUMPHREY.
FOLDING SEAT.
APPLICATION FILED OCT. 23, 1909.
974,384.
Patented Nov. 1, 1910.
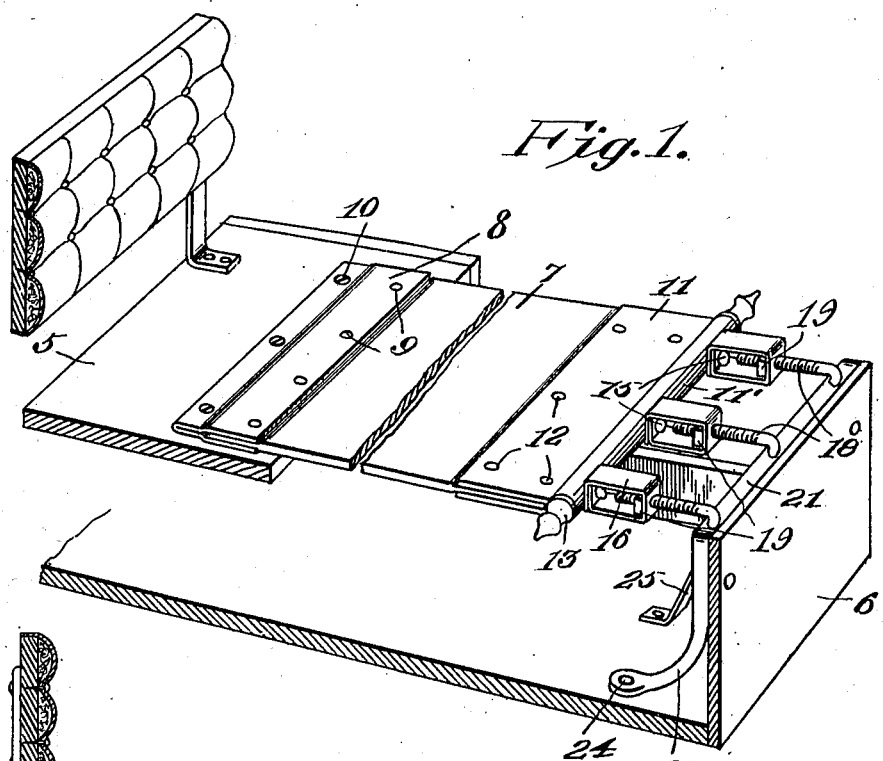
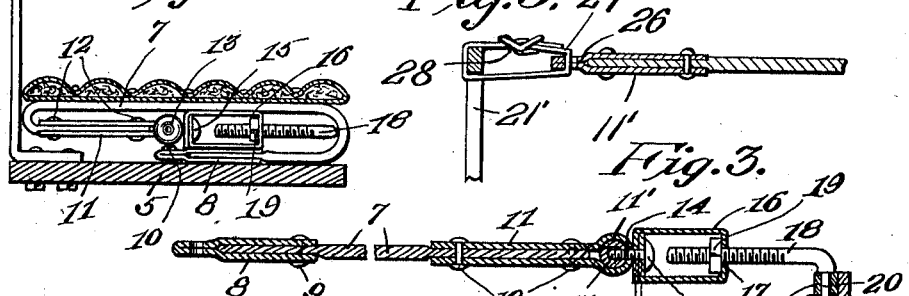
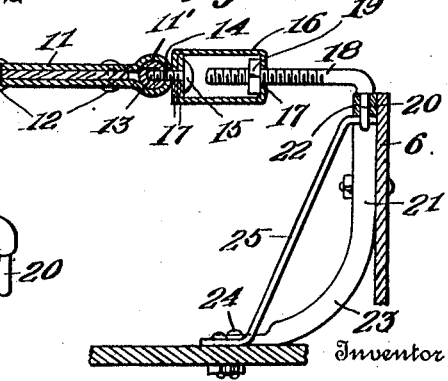
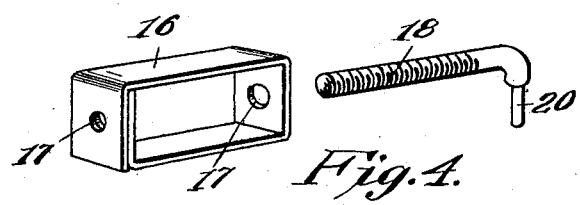
Witnesses
James F. Crown
H. F. McDuay
Inventor
Hill Humphrey
By Watson E. Coleman
Attorney

UNITED STATES PATENT OFFICE.

HILL HUMPHREY, OF JACKSONVILLE, NORTH CAROLINA.

FOLDING SEAT.

974,384.  Specification of Letters Patent.  Patented Nov. 1, 1910.

Application filed October 23, 1909. Serial No. 524,272.

*To all whom it may concern:*

Be it known that I, HILL HUMPHREY, a citizen of the United States, residing at Jacksonville, in the county of Onslow and State of North Carolina, have invented certain new and useful Improvements in Folding Seats, of which the following is a specification, reference being had to the accompanying drawings.

This invention relates to certain new and useful improvements in folding buggy seats and has for its object to provide a device of this character which is adapted to form an auxiliary seat or rest, whereby the occupant of the buggy may assume a reclining position.

Another object of the device resides in the provision of suitable means for supporting the inner end of a flexible seat which is adapted to be folded when not in use and positioned beneath the cushion of the stationary seat, the other end of the flexible seat member being permanently secured to the buggy seat.

A further object is to provide a suitable brace which is adapted to be secured to the dash-board, said brace having a plurality of apertures therein to receive suitable connecting members carried by a metal reinforcing member secured to the free end of the flexible seat, said brace being also adapted to strengthen the buggy dash-board and overcome the strains thereon.

With these and other objects in view, the invention consists of the novel construction, combination and arrangement of parts, hereinafter fully described and claimed, and illustrated in the accompanying drawings, in which—

Figure 1 is a perspective view of a portion of a buggy seat and dash-board, showing my improved removable seat in operative position; Fig. 2 is a side elevation of the device in folded position, the stationary seat being shown in section; Fig. 3 is a vertical longitudinal section; Fig. 4 is a detail perspective view of one of the attaching members; and Fig. 5 is a detail section illustrating a slightly modified form of the attaching means.

Referring to the drawing 5 indicates a stationary buggy seat and 6 the dash-board. To the seat 5 one end of a flexible seat member 7 is secured and is reinforced by means of a metallic plate 8 which is bent around the end of the seat material and secured on the opposite sides thereof by means of the rivets 9. This reinforcing plate is provided with a plurality of openings adjacent to its outer edge to receive the securing screws or bolts 10. The body portion 7 of the seat is preferably formed of a heavy piece of leather or other suitable flexible material, and its free end is reinforced by means of the plate 11 which is cylindrically formed at the outer edge of the material 7, as shown at 11′, and disposed upon opposite sides thereof to which it is secured by means of rivets 12. Disposed in the cylindrical edge portion of this reinforcing plate is a transverse rod 13 which carries a plurality of screw threaded studs 14 each formed with a head 15. These studs extend outwardly from the reinforcing plate and have secured thereto the ends of the link straps 16. These straps are preferably formed of sheet metal and are bent into substantially rectangular shape, as clearly shown in Fig. 1. The ends of these straps are perforated and lapped upon each other to receive the studs 14. The outer ends of the link straps are each provided with a perforation 17 through which an adjustable attaching rod 18 extends and is freely movable. Upon these rods the nuts 19 are disposed and are positioned within the rectangular links 16. The outer ends of the rods 18 are extended downwardly at right angles to the threaded portion thereof and are of reduced diameter, as shown at 20 in Fig. 3.

To the dash-board 6 of the buggy, a brace 21 is secured. This brace comprises a substantially U-shaped bar, the upper horizontal portion of which is provided with a series of openings 22 through which the angular ends of the rods 18 are adapted to be positioned. The vertical end portions of the brace are outwardly curved, as shown at 23, and positioned on the floor of the buggy to which they are secured by means of the screws or other analogous fastening devices 24. The vertical portions of the brace are secured to the dash-board of the buggy in a similar manner. Thus a very rigid supporting frame is provided which strengthens the dash-board and enables it to overcome the severe strains to which it is subjected when the auxiliary seat is put into use.

As clearly illustrated in Fig. 1, when the device is in use the angular extremities of the rods 18 are inserted through the openings 22 in the brace member 21, and the flexible body 7 of the seat is drawn or stretched between the stationary seat 5 and the dash-board 6. A couch is thus provided on which the occupants of the vehicle may recline should they become weary and desire to sleep. They can thus occupy a very restful position, whereas, in the present construction of buggy seats, if there are two occupants of the vehicle they must both retain their upright positions on the seat, and if there is but one occupant, and he desires to recline, he must lie lengthwise on the seat and transversely of the direction of movement of the vehicle, and his position is, consequently, very cramped and unsatisfactory for securing restful repose.

To provide an additional brace or support for the seat, an outwardly and downwardly extending leg 25 is provided, one end of which is secured centrally to the horizontal portion of the brace member 21 and its lower end is secured to the floor of the vehicle.

As shown in Fig. 2, when it is no longer desired to use the seat, the ends of the attaching rods 18 may be removed from the openings 22 and the seat folded and disposed beneath the cushion of the buggy seat.

The device may be arranged at any desired point between the opposite sides of the dash-board, and will be found to be admirably adapted for holding babies when not utilized for the purpose above set forth.

The connecting links 16 between the rods 18 and studs 14 will permit of the device being applied to numerous vehicles wherein there is considerable difference in the space between the seat 5 and dash-board 6, thus obviating the necessity of providing a separate seat for a number of vehicles.

From the foregoing it will be seen that I have provided an auxiliary buggy seat which may be easily and quickly attached in operative position and when in use provides means whereby a reposeful attitude may be assumed by the occupant. Its construction is very simple and the device may be manufactured at a minimum expense.

While I have shown and described what I believe to be the preferred form of my invention, it will be understood that various minor modifications may be resorted to without materially departing from the essential features or sacrificing any of the advantages of the invention.

In Fig. 5 a slightly modified form of the attaching means is illustrated, wherein the outer free end of the plate 11' is provided with a plurality of rectangular openings 26. Through each of these openings an attaching strap 27 is extended and is passed around the upper horizontal connecting portion of the brace 21'. The ends of the strap are secured together by means of the ordinary strap buckle 28. The strap may be adjusted to stretch the seat material 7 between the dash-board and the buggy seat. This form of the device may be manufactured much cheaper than that previously described and is as effective in use, while at the same time the cumbersome links and attaching rods are eliminated, thus allowing the seat to be more compactly folded and disposed beneath the buggy seat.

Having thus described the invention what is claimed is:

1. An auxiliary buggy seat comprising a flexible body having reinforcing plates secured to its opposite ends, the plates on one end of said body being secured to the buggy seat, a transverse rod secured between the plates on the free end of said body, screw threaded studs engaging said rods having heads on their outer ends, a plurality of links, each comprising a metal strap having its ends secured on said studs, a substantially U-shaped brace member secured to the dash-board of the vehicle, and a plurality of longitudinally adjustable attaching rods disposed through the outer ends of said links, said rods having their outer ends engaged with said brace member to stretch the flexible body seat between the stationary seat and the dash-board.

2. An auxiliary buggy seat comprising a flexible body having reinforcing plates secured to its opposite ends, one end of said body being secured to the stationary buggy seat, the plate on the free end of said body being integrally formed and provided with an intermediate cylindrical portion, a rod transversely disposed in said cylindrical portion carrying a plurality of studs provided with heads on their outer ends, said studs extending laterally from the cylindrical portion of said plates, a strap link having its ends disposed upon each other and provided with perforations through which said studs are disposed, attaching rods having threaded shank portions and angularly disposed outer ends, said shank portions being threaded and freely movable through openings in the outer ends of said links, securing nuts disposed on said rods, and a substantially U-shaped brace member secured to the dash-board, said brace member having a plurality of openings in its horizontal portion to receive the angular ends of said rods, said rods being adapted to be removed therefrom and the flexible body member folded upon itself and disposed under the cushion of the stationary seat when the auxiliary seat is not in use.

In testimony whereof I hereunto affix my signature in the presence of two witnesses.

HILL HUMPHREY.

Witnesses:
J. F. WOOTEN,
E. M. KOONCE.